United States Patent
Lin et al.

(10) Patent No.: US 12,316,126 B2
(45) Date of Patent: May 27, 2025

(54) ENERGY STORAGE AND MODULATING SYSTEM FOR RENEWABLE ENERGY OFF-GRID POWER GENERATION, AND METHOD FOR MODULATING THE SAME

(71) Applicant: Marvel-Tech Ltd., Shanghai (CN)

(72) Inventors: Gang Lin, Shanghai (CN); Qing Xu, Shanghai (CN); Yifeng Chen, Shanghai (CN)

(73) Assignee: MARVEL-TECH LTD., Shanghai (CN)

( * ) Notice: Subject to any disclaimer, the term of this patent is extended or adjusted under 35 U.S.C. 154(b) by 0 days.

(21) Appl. No.: 18/584,253

(22) Filed: Feb. 22, 2024

(65) Prior Publication Data

US 2025/0070564 A1    Feb. 27, 2025

(30) Foreign Application Priority Data

Aug. 24, 2023   (CN) .......................... 202311076476.9

(51) Int. Cl.
  *H02J 3/38* (2006.01)
  *F01D 15/10* (2006.01)
  *F03B 13/26* (2006.01)

(52) U.S. Cl.
  CPC .............. *H02J 3/381* (2013.01); *F01D 15/10* (2013.01); *F03B 13/26* (2013.01); *F05B 2220/61* (2013.01); *F05B 2220/705* (2020.08); *F05B 2220/708* (2013.01); *F05D 2260/213* (2013.01); *F05D 2260/42* (2013.01); *H02J 2300/24* (2020.01); *H02J 2300/28* (2020.01)

(58) Field of Classification Search
  CPC .......... H02J 3/38; H02J 3/381; H02J 2300/28; H02J 2300/24; F01D 15/10; F03B 13/26; F05B 2220/705; F05B 2220/61; F05B 2220/708; F05B 2260/213; F05B 2260/42
  See application file for complete search history.

(56) References Cited

U.S. PATENT DOCUMENTS

2024/0171005 A1*   5/2024   Chen .......................... C25B 1/04

* cited by examiner

*Primary Examiner* — Robert L Deberadinis
(74) *Attorney, Agent, or Firm* — MUNCY, GEISSLER, OLDS & LOWE, P.C.

(57) ABSTRACT

An energy storage and modulating system for renewable energy off-grid power generation, and a method for modulating the same. The excess electricity from a renewable energy power generation device after the electricity consumption on a demand-side is met is output to a short-term energy storage device and/or an electric energy conversion device to be converted into a combustion medium corresponding to a mid/long term energy storage device. When the renewable energy power generation devices cannot meet the demand-side electricity consumption, the electricity can be generated by modulating the electric energy stored in the short-term energy storage device and/or burning the combustion medium corresponding to the energy storage through a gas turbine power generation system, supplementing the electric energy output from the renewable energy power generation device, thereby enabling the entire off-grid power generation system supply stable energy.

10 Claims, 1 Drawing Sheet

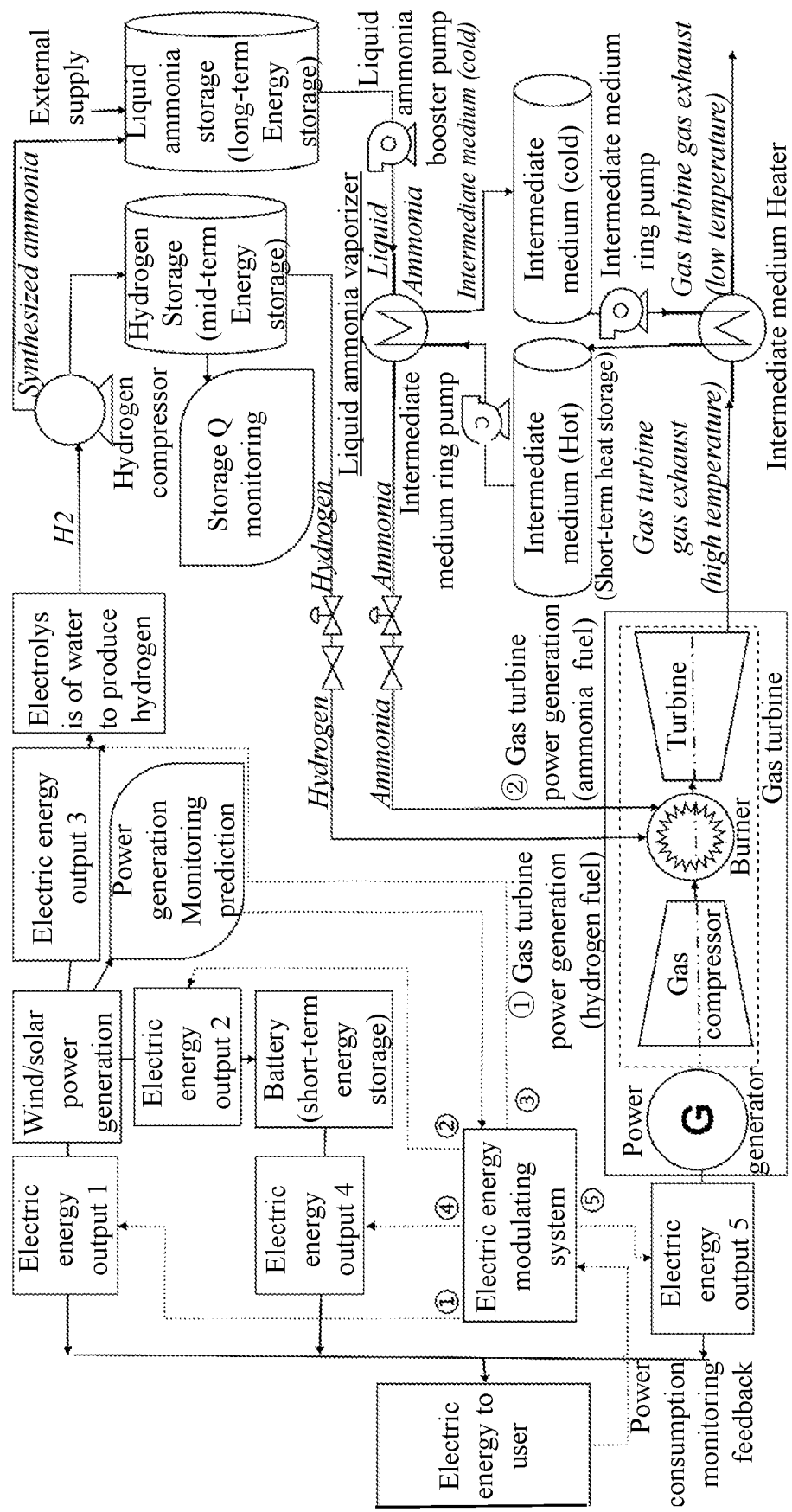

ENERGY STORAGE AND MODULATING SYSTEM FOR RENEWABLE ENERGY OFF-GRID POWER GENERATION, AND METHOD FOR MODULATING THE SAME

BACKGROUND OF THE INVENTION

Field of the Invention

The invention belongs to the technical field of off-grid power generation system, in particular, to an energy storage and modulating system for renewable energy off-grid power generation, and a method for modulating the same.

Description of the Prior Art

Off-grid power generation system refers to the off-grid power supply mode that adopts regional independent power generation and household independent power generation.

Due to the influence of factors such as climate, season, morning and evening, the stability in the wind/solar power generation is poor, which is not suitable for direct grid connection, or the cost of grid connection is high and has a great impact on the power grid; when the off-grid power generation is supplied to users, there are peaks/valleys and other unstable conditions (i.e., during the peak period of power generation, there is too much electric energy, which cannot be consumed all by users; during the low period of power generation, there is less electric energy, which cannot meet user needs); to obtain stable electric energy at the user end, the problem of peak shaving and valley filling of electric energy must be solved.

SUMMARY OF THE INVENTION

The technical problem to be solved by the invention is to provide an energy storage and modulating system for renewable energy off-grid power generation, and a method for modulating the same, so as to solve the problem that the existing off-grid power generation system is difficult to output stable electric energy.

In order to solve the problem, the invention uses the following technical solutions:

An energy storage and modulating system for renewable energy off-grid power generation according to the invention includes:
  a renewable energy power generation device, including a first electric energy output end, a second electric energy output end, and a third electric energy output end;
  a short-term energy storage device, having an input end electrically connected with the second electric energy output end, an output end of the short-term energy storage device being a fourth electric energy output end;
  an electric energy conversion device, having an input end electrically connected with the third electric energy output end for receiving and converting the electric energy into a first combustion medium or a second combustion medium, a stability of the second combustion medium being higher than that of the first combustion medium;
  a mid-term energy storage device, having an input end communicated with a first combustion medium output end of the electric energy conversion device for temporarily storing the first combustion medium;
  a long-term energy storage device, having an input end communicated with a second combustion medium output end of the electric energy conversion device for temporarily storing the second combustion medium;
  a gas turbine power generation system, having a fuel input end communicated with an output end of the mid-term energy storage device and an output end of the long-term energy storage device respectively, an output end of the gas turbine power generation device being a fifth electric energy output end;
  a demand-side power consumption monitoring and feedback system, used for outputting power consumption monitoring and feedback information;
  an electric energy modulating system having input ends respectively in signal connection with the first electric energy output end, the second electric energy output end, the third electric energy output end, the fourth electric energy output end, the fifth electric energy output end, the demand-side power consumption monitoring and feedback system and the renewable energy power generation device for receiving the power consumption monitoring and feedback information and power generation monitoring and prediction information of the renewable energy power generation device, modulating the first electric energy output end, the fourth electric energy output end and the fifth electric energy output end to match electric energy output, and modulating the second electric energy output end and the third electric energy output end to perform short-term energy storage, mid-term energy storage and/or long-term energy storage.

For the energy storage and modulating system for renewable energy off-grid power generation according to the invention, the renewable energy power generation device is a wind power generation device and/or a solar power generation device and/or a photovoltaic power generation device and/or a tidal energy power generation device.

For the energy storage and modulating system for renewable energy off-grid power generation according to the invention, the short-term energy storage device is a battery energy storage device.

For the energy storage and modulating system for renewable energy off-grid power generation according to the invention, the electric energy conversion device includes an electrolysis water hydrogen production device and an ammonia production device, an electric energy input end of the electrolysis water hydrogen production device is electrically connected with the third electric energy output end, and a first hydrogen output end of the electrolysis water hydrogen production device is communicated with the input end of the mid-term energy storage device; a hydrogen input end of the ammonia production device is communicated with a second hydrogen output end of the electrolysis water hydrogen production device, and an ammonia output end of the ammonia production device is communicated with the input end of the long-term energy storage device.

For the energy storage and modulating system for renewable energy off-grid power generation according to the invention, the first combustion medium is the hydrogen, and the mid-term energy storage device includes a hydrogen compressor and a hydrogen storage tank;
  an input end of the hydrogen compressor is communicated with the first combustion medium output end of the electric energy conversion device, an output end of the hydrogen compressor is communicated with an input end of the hydrogen storage tank, and an output end of the hydrogen storage tank is communicated with the fuel input end of the gas turbine power generation device;

wherein the hydrogen storage tank is in signal connection with the electric energy modulating system for outputting hydrogen reserve monitoring information.

For the energy storage and modulating system for renewable energy off-grid power generation according to the invention, the second combustion medium is the ammonia, and the long-term energy storage device is a liquid ammonia storage tank and a liquid ammonia vaporizer; an input end of the liquid ammonia storage tank is communicated with the second combustion medium output end of the electric energy conversion device, an output end of the liquid ammonia storage tank is communicated with a liquid ammonia input end of the liquid ammonia vaporizer, and an ammonia output end of the liquid ammonia vaporizer is communicated with the fuel input end of the gas turbine power generation device.

For the energy storage and modulating system for renewable energy off-grid power generation according to the invention, the long-term energy storage device further includes a heat exchange part, and the heat exchange part comprises an intermediate medium pipeline, an intermediate medium circulation pump and an intermediate medium heat exchanger;
- the intermediate medium pipeline is communicated with an intermediate medium passage in the intermediate medium heat exchanger and an intermediate medium passage in the liquid ammonia vaporizer to form an intermediate medium circulation pipeline; the intermediate medium circulation pump is arranged on the intermediate medium circulation pipeline; a heat source input end of the intermediate medium heat exchanger is communicated with a gas turbine exhaust output end of the gas turbine power generation system.

For the energy storage and modulating system for renewable energy off-grid power generation according to the invention, the gas turbine power generation system includes a burner, a power generator, a gas compressor and a turbine;
- preferably, the gas turbine power generation system includes a burner, a power generator, a gas compressor, and a turbine that are coaxially rotatably connected with each other;
- an air input end of the burner is communicated with an output end of the gas compressor, a fuel input end of the burner is communicated with the output end of the mid-term energy storage device and the output end of the long-term energy storage device respectively, and an output end of the burner is communicated with an input end of the turbine.

A modulating method according to the invention is applied to energy storage and modulating system for renewable energy off-grid power generation according to any one of the above, including:
1) an energy storage state, when an electricity output in the power generation monitoring and prediction information is greater than a demand-side power consumption in the power consumption monitoring and feedback information,
   modulating, by the electric energy modulating system, excess power generation, for outputting to the short-term energy storage device through the second electric energy output end, or outputting, or for outputting to the electric energy conversion device through the third electric energy output end to prepare the first combustion medium and store into the mid-term energy storage device or to prepare the second combustion medium and store into the long-term energy storage device;
2) an energy supplement state, when an electricity output in the power generation monitoring and prediction information is smaller than the demand-side power consumption in the power consumption monitoring and feedback information,
   modulating, by the electric energy modulating system, the electric energy output by the short-term energy storage device through the fourth electric energy output end to supplement the demand-side power consumption, and/or modulating the gas turbine power generation system to burn the first combustion medium for power generation and outputting the electric energy through the fifth electric energy output end to supplement the demand-side power consumption, and/or modulating the gas turbine power generation system to burn the second combustion medium for power generation and outputting the electric energy through the fifth electric energy output end to supplement the demand-side power consumption.

For the modulating method according to the invention, in the energy supplement state, according to electricity output prediction information in power generation monitoring and prediction information, by the electric energy modulating system,
- modulating the short-term energy storage device to output the electric energy through the fourth electric energy output end if the electricity output prediction information indicates that a short-term power generation trough will occur;
- modulating the short-term energy storage device to output the electric energy through the fourth electric energy output end and modulating the gas turbine power generation system to burn the first combustion medium for power generation while outputting the electric energy through the fifth electric energy output end to supplement the demand-side power consumption if the electricity output prediction information indicates that a mid-term power generation trough will occur;
- modulating the short-term energy storage device to output the electric energy through the fourth electric energy output end and modulating the gas turbine power generation system to burn the first combustion medium/the second combustion medium for power generation while outputting the electric energy through the fifth electric energy output end to supplement the demand-side power consumption if the electricity output prediction information indicates that a long-term power generation trough will occur.

Compared with the prior art, the invention has the following advantages and positive effects due to the adoption of the above technical solutions:

In an embodiment of the invention, the excess electricity from a renewable energy power generation device after the electricity consumption on a demand-side is met is output to a short-term energy storage device and/or to an electric energy conversion device to be converted into a combustion medium corresponding to a mid-term energy storage device/a long-term energy storage device. When the renewable energy power generation devices cannot meet the electricity consumption of the demand-side, the electricity can be generated by modulating the electric energy stored in the short-term energy storage device and/or burning the combustion medium corresponding to the energy storage through a gas turbine power generation system, which supplements the electric energy output from the renewable energy power generation device, thereby enabling the entire off-grid power generation system to achieve stable energy supply. Based on power generation with renewable energy, a user can achieve stable power supply through short-term, mid-term, and long-term energy storage, and through the rational utilization of energy storage, the most economical and stable energy supply solution can be achieved.

BRIEF DESCRIPTION OF THE DRAWINGS

The FIGURE is a view of an energy storage and modulating system for renewable energy off-grid power generation according to the invention.

DESCRIPTION OF THE PREFERRED EMBODIMENTS

The energy storage and modulating system for renewable energy off-grid power generation proposed by the invention, and the method for modulating the same will be further described in detail below with reference to the accompanying drawings and specific embodiments. Advantages and features of the invention will be apparent from the following description and claims.

Embodiment One

With reference to the Figure, in an embodiment, an energy storage and modulating system for renewable energy off-grid power generation includes a renewable energy power generation device, a short-term energy storage device, an electric energy conversion device, a mid-term energy storage device, a long-term energy storage device, a gas turbine power generation system, a demand-side power consumption monitoring and feedback system and an electric energy modulating system.

The renewable energy power generation device includes a first electric energy output end, a second electric energy output end, and a third electric energy output end.

The short-term energy storage device has an input end electrically connected with the second electric energy output end, an output end of the short-term energy storage device being a fourth electric energy output end.

The electric energy conversion device has an input end electrically connected with the third electric energy output end for receiving and converting the electric energy into a first combustion medium or a second combustion medium, a stability of the second combustion medium being higher than that of the first combustion medium. The mid-term energy storage device has an input end communicated with a first combustion medium output end of the electric energy conversion device for temporarily storing the first combustion medium. The long-term energy storage device has an input end communicated with a second combustion medium output end of the electric energy conversion device for temporarily storing the second combustion medium.

The gas turbine power generation system has a fuel input end communicated with an output end of the mid-term energy storage device and an output end of the long-term energy storage device respectively, an output end of the gas turbine power generation device being a fifth electric energy output end.

The demand-side power consumption monitoring and feedback system is used for outputting power consumption monitoring and feedback information.

The electric energy modulating system has an input end in signal connection with the first electric energy output end, the second electric energy output end, the third electric energy output end, the fourth electric energy output end, the fifth electric energy output end, the demand-side power consumption monitoring and feedback system and the renewable energy power generation device respectively for receiving the power consumption monitoring and feedback information and power generation monitoring and prediction information of the renewable energy power generation device, modulating the first electric energy output end, the fourth electric energy output end and the fifth electric energy output end to match electric energy output, and modulating the second electric energy output end and the third electric energy output end to perform short-term energy storage, mid-term energy storage and/or long-term energy storage, i.e., flexibly modulating the electric energy output through real-time power generation monitoring and short-term and long-term power generation predictions in combination of electricity needs for users.

In the embodiment, the renewable energy power generation device outputs the excess power to the short-term energy storage device and/or to the electric energy conversion device to be converted into the combustion medium of the corresponding mid-term energy storage device/the long-term energy storage device after the power consumption is met at the demand-side. When the renewable energy power generation devices cannot meet the electricity consumption of the demand-side, the electricity may be generated by modulating the electric energy stored in the short-term energy storage device and/or burning the combustion medium corresponding to the energy storage through a gas turbine power generation system, which supplements the electric energy output from the renewable energy power generation device, thereby enabling the entire off-grid power generation system to achieve stable energy supply. Based on power generation with renewable energy, a user may achieve stable power supply by way of short-term, mid-term and long-term energy storage, and through the rational utilization of energy storage, the most economical and stable energy supply solution may be achieved.

Further description will be given below for the energy storage and modulating system for renewable energy off-grid power generation according to the embodiment.

In the embodiment, the renewable energy power generation device may be specifically a wind power generation device and/or a solar power generation device and/or a photovoltaic power generation device and/or a tidal energy power generation device.

In the embodiment, the short-term energy storage device is a battery energy storage device.

(Short-term energy storage: during the peak of renewable energy power generation, the surplus electric energy is used to charge the energy storage battery, and during the trough of the power generation, the battery is discharged to supplement the needs of the user for energy use; the battery energy storage is based on the current technology and other factors, usually lasting for 2 hours, and the battery energy storage for a long time is facing many challenges such as costs and product safety, so the battery solution is used as a short-term energy storage solution.)

In the embodiment, the above electric energy conversion device includes an electrolysis water hydrogen production device and an ammonia production device. An electric energy input end of the electrolysis water hydrogen production device is electrically connected with the third electric energy output end, and a first hydrogen output end of the electrolysis water hydrogen production device is communicated with an input end of the mid-term energy storage device (i.e., storing the chemical energy converting the electric energy into the hydrogen).

A hydrogen input end of the ammonia production device is communicated with a second hydrogen output end of the electrolysis water hydrogen production device for receiving hydrogen generated by electrolytic and synthesizing ammonia for energy storage (i.e., storing the chemical energy converting the electric energy into the ammonia), and an ammonia output end of the ammonia production device is communicated with an input end of the long-term energy storage device.

Further, since the first combustion medium is the hydrogen, the mid-term energy storage device may include a hydrogen compressor and a hydrogen storage tank.

An input end of the hydrogen compressor is communicated with the first combustion medium output end of the electric energy conversion device, an output end of the hydrogen compressor is communicated with an input end of the hydrogen storage tank, and an output end of the hydrogen storage tank is communicated with the fuel input end of the gas turbine power generation device (i.e., first compressing the hydrogen generated by electrolytic, which is then introduced into the hydrogen storage tank to store with a certain pressure, wherein the purpose of adding pressure is to increase the density of the hydrogen, thereby increasing the reserves of hydrogen storage tank; however, the nature of hydrogen is relatively stable, so the above solution is used as a mid-term energy storage solution).

(Mid-term energy storage: during the peak of power generation with renewable energy, the surplus electricity is made into hydrogen through the electrolyte process, and the hydrogen is stored; during the trough of the power generation, the hydrogen is used as fuel, and the power generation is performed through the gas turbine or gas-steam to output stable electric energy to supplement the needs of users for stable electric energy).

Since the second combustion medium is the ammonia, and the long-term energy storage device is a liquid ammonia storage tank and a liquid ammonia vaporizer; an input end of the liquid ammonia storage tank is communicated with the second combustion medium output end of the electric energy conversion device, an output end of the liquid ammonia storage tank is communicated with a liquid ammonia input end of the liquid ammonia vaporizer, and an ammonia output end of the liquid ammonia vaporizer is communicated with the fuel input end of the gas turbine power generation device (the ammonia may be stored at room temperature, with a stable nature, which is suitable for long-term storage; therefore, the above solution is used as a long-term energy storage solution).

Further, the liquid ammonia storage tank may be further provided with an external liquid ammonia input port, and then the storage may be performed in combination of external ammonia supply as spare fuel.

(Long-term energy storage: the electric energy generated by the renewable energy power generation may be stored by electrolytic water hydrogen preparation and synthetic ammonia, which may be used as spare fuel in combination of storage of external ammonia supply; during the trough of wind/solar power generation, when the stored hydrogen is not enough to support the demand for ultra-long-term stable power consumption, the circular power generation may be performed through the ammonia fuel gas turbine or gas-steam, supplementing the needs of users for ultra-long-term stable electric energy).

Further, the hydrogen storage tank is in signal connection with the electric energy modulating system for outputting hydrogen reserve monitoring information. After the hydrogen reserves reach the limit, the hydrogen generated by electrolyte may be output to the ammonia production device for preparing ammonia, and when the hydrogen reserves are low to the minimum, the liquid ammonia storage tank may be controlled to output ammonia to the gas turbine for power generation by burning ammonia.

In the embodiment, in order to improve energy utilization, the long-term energy storage device may further include a heat exchange part, and the heat exchange part includes an intermediate medium pipeline, an intermediate medium circulation pump, and an intermediate medium heat exchanger.

The intermediate medium pipeline is communicated with an intermediate medium passage in the intermediate medium heat exchanger and an intermediate medium passage in the liquid ammonia vaporizer to form an intermediate medium circulation pipeline. The intermediate medium circulation pump is arranged on the intermediate medium circulation pipeline. A heat source input end of the intermediate medium heat exchanger is communicated with a gas turbine exhaust output end of the gas turbine power generation system, i.e., using the heat of gas exhaust to heat the intermediate medium flowing through the intermediate medium heat exchanger so that the heated intermediate medium may be heated and vaporized for the liquid ammonia flowing through the liquid ammonia vaporizer.

Further, the intermediate medium pipeline between the output end of the intermediate medium heat exchanger and the input end of the liquid ammonia vaporizer may be provided with the hot intermediate medium box for temporarily storing the intermediate medium heated by the gas exhaust of the gas turbine, thereby achieving short-term heat storage; the intermediate medium circulation pump is arranged correspondingly on the intermediate medium pipeline between the hot intermediate medium box and the liquid ammonia vaporizer. A cold intermediate medium box may be arranged correspondingly on the intermediate medium pipeline between the input end of the intermediate medium heat exchanger and the output end of the liquid ammonia vaporizer, and the intermediate medium pipeline between the cold intermediate medium box and the intermediate medium heat exchanger may also be provided with the intermediate medium circulation pump. The intermediate medium may be water, heat-conductive oil, etc.

In the embodiment, the gas turbine power generation system includes a burner, a power generator, a gas compressor, and a turbine that are coaxially in transmissive connection with each other.

An air input end of the burner is communicated with an output end of the gas compressor, a fuel input end of the burner is communicated with the output end of the mid-term energy storage device and the output end of the long-term energy storage device, respectively, and an output end of the burner is communicated with an input end of the turbine. An electric energy output end of the power generator is the above fifth electric energy output end.

The gas turbine uses a unique burner and a burning nozzle thereof, which may meet the requirements for burning hydrogen or ammonia fuel without changing parts. The burner takes ammonia fuel as the basic load fuel while considering a variety of zero-carbon fuels such as natural gas, hydrogen, and ammonia pyrolysis gas; the fuel and combustion air are supplied to the flame cylinder through the burning nozzle, and are burned fully in the flame cylinder. Due to the weak reaction characteristics of ammonia, the burning nozzle may be designed as two-stage spin, which is provided with fuel and air, respectively. The fuel-rich flame is formed in an inner nozzle, and the fuel-poor flame is formed in an outer nozzle, thereby achieving stable burning of ammonia.

Further, the gas turbine power generation system may further include a waste heat boiler and a steam gas turbine generator set. The waste heat boiler is used to receive the turbine gas exhaust output from the turbine, and form the high-temperature water vapor to be output to the steam gas turbine generator set for further power generation so as to improve the energy utilization rate.

For the renewable energy off-grid power generation system according to the embodiment, through the intelligent electric energy modulating system, the distribution and utilization of electric energy may be optimized, creating better economic value, and providing stable high-quality electric energy to users.

Embodiment Two

The embodiment provides a modulating method, which is applied to energy storage and modulating system for renewable energy off-grid power generation according to the above Embodiment 1, the method including:

1) An energy storage state, when an electricity output in the power generation monitoring and prediction information is greater than a demand-side power consumption in the power consumption monitoring and feedback information, the electric energy modulating system modulates excess power generation for outputting to the short-term energy storage device through the second electric energy output end, or outputting, or for outputting to the electric energy conversion device through the third electric energy output end to prepare the first combustion medium and store into the mid-term energy storage device or to prepare the second combustion medium and store into the long-term energy storage device.

Further, according to the power generation monitoring and prediction information, if wind/solar power generation is insufficient (trough of power generation) after the power generation prediction, electrical energy storage is performed according to the predicted time to ensure that the battery energy storage may meet the "trough filling" of short-term power generation, and during the rest of the time, excess power generation is used to electrolyze water to produce hydrogen and store hydrogen;

according to the prediction of wind/solar power generation, if the mid-term energy storage of hydrogen reaches the limit, hydrogen is produced by electrolyzing water and output for ammonia storage.

2) An energy supplement state, when an electricity output in the power generation monitoring and prediction information is smaller than the demand-side power consumption in the power consumption monitoring and feedback information, the electric energy modulating system modulates the electric energy output by the short-term energy storage device through the fourth electric energy output end to supplement the demand-side power consumption, and/or modulating the gas turbine power generation system to burn the first combustion medium for power generation and outputting the electric energy through the fifth electric energy output end to supplement the demand-side power consumption, and/or modulating the gas turbine power generation system to burn the second combustion medium for power generation and outputting the electric energy through the fifth electric energy output end to supplement the demand-side power consumption.

Further, in the energy supplement state, according to electricity output prediction information in power generation monitoring and prediction information, the electric energy modulating system modulates the battery energy storage device to output the electric energy through the fourth electric energy output end if the electricity output prediction information indicates that a short-term power generation trough will occur, modulates the battery energy storage device to output the electric energy through the fourth electric energy output end and modulates the gas turbine power generation system to burn the first combustion medium (hydrogen) for power generation while outputting the electric energy through the fifth electric energy output end to supplement the demand-side power consumption if the electricity output prediction information indicates that a mid-term power generation trough will occur; and modulates the short-term energy storage device to output the electric energy through the fourth electric energy output end and modulates the gas turbine power generation system to burn the first combustion medium (hydrogen)/the second combustion medium (ammonia) for power generation while outputting the electric energy through the fifth electric energy output end to supplement the demand-side power consumption if the electricity output prediction information indicates that a long-term power generation trough will occur.

The implementations of the invention are described in detail above with reference to the accompanying drawings, but the invention is not limited to the above implementations. Even if various changes are made to the invention, if these changes fall within the scope of the claims of the invention and equivalent technologies, they still fall within the protection scope of the invention.

What is claimed is:

1. An energy storage and modulating system for renewable energy off-grid power generation comprising:

a renewable energy power generation device having a first electric energy output end, a second electric energy output end, and a third electric energy output end;

a short-term energy storage device having an input end and an output end, the input end electrically connected with the second electric energy output end, and the output end being a fourth electric energy output end;

an electric energy conversion device having an input end electrically connected with the third electric energy output end for receiving and converting electric energy into a first combustion medium or a second combustion medium, wherein a stability of the second combustion medium is higher than a stability of the first combustion medium;

a mid-term energy storage device having an input end communicated with a first combustion medium output end of the electric energy conversion device for temporarily storing the first combustion medium;

a long-term energy storage device having an input end communicated with a second combustion medium output end of the electric energy conversion device for temporarily storing the second combustion medium;

a gas turbine power generation system, wherein a fuel input end of the gas turbine power generation system is communicated with an output end of the mid-term energy storage device and an output end of the long-term energy storage device respectively, and an output end of the gas turbine power generation device is a fifth electric energy output end;
a demand-side power consumption monitoring and feedback system, used for outputting power consumption monitoring and feedback information; and
an electric energy modulating system having input ends respectively in signal connection with the first electric energy output end, the second electric energy output end, the third electric energy output end, the fourth electric energy output end, the fifth electric energy output end, the demand-side power consumption monitoring, and feedback system and the renewable energy power generation device for receiving the power consumption monitoring and feedback information and power generation monitoring and prediction information of the renewable energy power generation device, modulating the first electric energy output end, the fourth electric energy output end and the fifth electric energy output end to match electric energy output, and modulating the second electric energy output end and the third electric energy output end to perform short-term energy storage, mid-term energy storage, and/or long-term energy storage.

2. The energy storage and modulating system for renewable energy off-grid power generation according to claim 1, wherein the renewable energy power generation device is a wind power generation device and/or a solar power generation device and/or a photovoltaic power generation device and/or a tidal energy power generation device.

3. The energy storage and modulating system for renewable energy off-grid power generation according to claim 1, wherein the short-term energy storage device is a battery energy storage device.

4. The energy storage and modulating system for renewable energy off-grid power generation according to claim 1, wherein the electric energy conversion device comprises an electrolysis water hydrogen production device and an ammonia production device, wherein an electric energy input end of the electrolysis water hydrogen production device is electrically connected with the third electric energy output end, and a first hydrogen output end of the electrolysis water hydrogen production device is communicated with the input end of the mid-term energy storage device, and wherein a hydrogen input end of the ammonia production device is communicated with a second hydrogen output end of the electrolysis water hydrogen production device, and an ammonia output end of the ammonia production device is communicated with the input end of the long-term energy storage device.

5. The energy storage and modulating system for renewable energy off-grid power generation according to claim 1, wherein the first combustion medium is the hydrogen, and the mid-term energy storage device comprises a hydrogen compressor and a hydrogen storage tank;
an input end of the hydrogen compressor is communicated with the first combustion medium output end of the electric energy conversion device, an output end of the hydrogen compressor is communicated with an input end of the hydrogen storage tank, and an output end of the hydrogen storage tank is communicated with the fuel input end of the gas turbine power generation device;
wherein the hydrogen storage tank is in signal connection with the electric energy modulating system for outputting hydrogen reserve monitoring information.

6. The energy storage and modulating system for renewable energy off-grid power generation according to claim 1, wherein the second combustion medium is ammonia, and the long-term energy storage device is a liquid ammonia storage tank and a liquid ammonia vaporizer; an input end of the liquid ammonia storage tank is communicated with the second combustion medium output end of the electric energy conversion device, an output end of the liquid ammonia storage tank is communicated with a liquid ammonia input end of the liquid ammonia vaporizer, and an ammonia output end of the liquid ammonia vaporizer is communicated with the fuel input end of the gas turbine power generation device.

7. The energy storage and modulating system for renewable energy off-grid power generation according to claim 6, wherein the long-term energy storage device further comprises a heat exchange part, and the heat exchange part comprises an intermediate medium pipeline, an intermediate medium circulation pump, and an intermediate medium heat exchanger;
the intermediate medium pipeline is communicated with an intermediate medium passage in the intermediate medium heat exchanger and an intermediate medium passage in the liquid ammonia vaporizer to form an intermediate medium circulation pipeline; the intermediate medium circulation pump is arranged on the intermediate medium circulation pipeline; a heat source input end of the intermediate medium heat exchanger is communicated with a gas turbine exhaust output end of the gas turbine power generation system.

8. The energy storage and modulating system for renewable energy off-grid power generation according to claim 1, wherein the gas turbine power generation system comprises a burner, a power generator, a gas compressor, and a turbine;
an air input end of the burner is communicated with an output end of the gas compressor, a fuel input end of the burner is communicated with the output end of the mid-term energy storage device and the output end of the long-term energy storage device respectively, and an output end of the burner is communicated with an input end of the turbine.

9. A modulating method, applied to the energy storage and modulating system for renewable energy off-grid power generation according to claim 1, the modulating method comprising:
1) an energy storage state, when an electricity output in the power generation monitoring and prediction information is greater than a demand-side power consumption in the power consumption monitoring and feedback information,
modulating, by the electric energy modulating system, excess power generation, for outputting the excess power generation to the short-term energy storage device through the second electric energy output end, or for outputting the excess power generation to the electric energy conversion device through the third electric energy output end to prepare the first combustion medium and store the first combustion medium into the mid-term energy storage device or to prepare the second combustion medium and store the second combustion medium into the long-term energy storage device;
2) an energy supplement state, when an electricity output in the power generation monitoring and prediction information is smaller than the demand-side power consumption in the power consumption monitoring and feedback information, modulating, by the electric energy modulating system, the electric energy output by the short-term energy storage device through the fourth electric energy output end to supplement the demand-side power consumption, and/or modulating the gas turbine power generation system to burn the first combustion medium for power generation and outputting the electric energy through the fifth electric energy output end to supplement the demand-side power consumption, and/or modulating the gas turbine power generation system to burn the second combustion medium for power generation and outputting the electric energy through the fifth electric energy output end to supplement the demand-side power consumption.

10. The modulating method according to claim 9, wherein in the energy supplement state, according to electricity output prediction information in power generation monitoring and prediction information, by the electric energy modulating system, modulating the short-term energy storage device to output the electric energy through the fourth electric energy output end if the electricity output prediction information indicates that a short-term power generation trough will occur;

modulating the short-term energy storage device to output the electric energy through the fourth electric energy output end and modulating the gas turbine power generation system to burn the first combustion medium for power generation while outputting the electric energy through the fifth electric energy output end to supplement the demand-side power consumption if the electricity output prediction information indicates that a mid-term power generation trough will occur;

modulating the short-term energy storage device to output the electric energy through the fourth electric energy output end and modulating the gas turbine power generation system to burn the first combustion medium/the second combustion medium for power generation while outputting the electric energy through the fifth electric energy output end to supplement the demand-side power consumption if the electricity output prediction information indicates that a long-term power generation trough will occur.

* * * * *